US011578433B2

(12) United States Patent
Mercader et al.

(10) Patent No.: US 11,578,433 B2
(45) Date of Patent: Feb. 14, 2023

(54) METHOD FOR PRODUCING A CARBON FIBRE BY RECYCLING COTTON

(71) Applicants: ASSOCIATION POUR LE DÉVELOPPEMENT DE L'ENSEIGNEMENT ET DES RECHERCHES AUPRÈS DES UNIVERSITÈS, Pessac (FR); INSTITUT DE RECHERCHE TECHNOLOGIQUE JULES VERNE, Bouguenais (FR); FAURECIA SERVICES GROUPE, Nanterre (FR)

(72) Inventors: Célia Mercader, Talence (FR); Simon Jestin, Sadirac (FR); Céline Largeau, Le Loroux Bottereau (FR)

(73) Assignees: ASSOCIATION POUR LE DÉVELOPPEMENT DE L'ENSEIGNEMENT ET DES RECHERCHES AUPRÈS DES UNIVERSITÈS. DES CENTRES DE RECHERCHE ET DES ENTREPRISES D'AQITAINE (ADERA); INSTITUT DE RECHERCHE TECHNOLOGIQUE JULES VERNE; FAURECIA SERVICES GROUPE

( * ) Notice: Subject to any disclaimer, the term of this patent is extended or adjusted under 35 U.S.C. 154(b) by 167 days.

(21) Appl. No.: 16/954,909

(22) PCT Filed: Dec. 17, 2018

(86) PCT No.: PCT/FR2018/053326
§ 371 (c)(1),
(2) Date: Sep. 9, 2020

(87) PCT Pub. No.: WO2019/122648
PCT Pub. Date: Jun. 27, 2019

(65) Prior Publication Data
US 2021/0017675 A1 Jan. 21, 2021

(30) Foreign Application Priority Data
Dec. 18, 2017 (FR) ..................... 1762397

(51) Int. Cl.
| | | |
|---|---|---|
| B01D 37/00 | (2006.01) |
| B29C 70/34 | (2006.01) |
| B29C 70/42 | (2006.01) |
| B29C 70/46 | (2006.01) |
| B29C 70/48 | (2006.01) |
| B32B 37/16 | (2006.01) |
| B32B 37/18 | (2006.01) |
| B32B 37/20 | (2006.01) |
| D01D 1/02 | (2006.01) |
| D01D 1/10 | (2006.01) |
| D01D 5/06 | (2006.01) |
| D01D 5/12 | (2006.01) |

(Continued)

(52) U.S. Cl.
CPC ................ D01F 9/16 (2013.01); B29C 70/12 (2013.01); B29C 70/345 (2013.01); C08J 5/042 (2013.01); D01D 1/106 (2013.01); D01F 1/10 (2013.01); D01G 11/00 (2013.01); F01D 5/282 (2013.01); F03D 1/0675 (2013.01); B29K 2105/12 (2013.01); B29K 2307/04 (2013.01); B29L 2031/085 (2013.01); C08J 2301/02 (2013.01)

(58) Field of Classification Search
CPC ....... B01D 37/00; B29C 70/34; B29C 70/345; B29C 70/42; B29C 70/46; B29C 70/48; B32B 37/16; B32B 37/18; B32B 37/20; D01D 1/02; D01D 1/10; D01D 1/106; D01D 5/06; D01D 5/12; D01F 1/02; D01F 9/16; D01G 11/00; D01G 11/02; D02J 13/00
USPC .......... 264/29.2, 29.4, 169, 187, 203, 210.6, 264/210.8, 211, 258, 914; 19/65 R; 156/242, 245; 210/767; 423/447.9
See application file for complete search history.

(56) References Cited

U.S. PATENT DOCUMENTS

| | | | | |
|---|---|---|---|---|
| 301,024 A | * | 6/1884 | Weston ................ | B82Y 30/00 264/29.2 X |
| 1,787,542 A | * | 1/1931 | Miles ................. | C08B 1/003 536/99 |

(Continued)

FOREIGN PATENT DOCUMENTS

| | | | |
|---|---|---|---|
| CN | 1587457 | 3/2005 | |
| CN | 1255585 C * | 5/2006 | ............... D01F 9/16 |

(Continued)

OTHER PUBLICATIONS

Translation of JP 06010206 A (published on Jan. 18, 1994).*

(Continued)

*Primary Examiner* — Leo B Tentoni
(74) *Attorney, Agent, or Firm* — Perman & Green, LLP (57) ABSTRACT

The invention concerns a method for producing a carbon fibre, that comprises a step of preparing a continuous fibre made of cellulose from cotton fabrics, by extracting, from these fabrics, cotton in the form of short, discontinuous fibres, and implementing a solvent spinning process; this step being followed by a step of carbonising said obtained continuous fibre made from cellulose, in order to form a carbon fibre. This carbon fibre can be used, in particular, for producing articles made from composite material made from carbon fibres and polymer organic resin.

10 Claims, 1 Drawing Sheet

(51) Int. Cl.

| | | |
|---|---|---|
| *D01F 1/02* | (2006.01) | |
| *D01G 11/02* | (2006.01) | |
| *D02J 13/00* | (2006.01) | |
| *D01F 9/16* | (2006.01) | |
| *B29C 70/12* | (2006.01) | |
| *C08J 5/04* | (2006.01) | |
| *D01F 1/10* | (2006.01) | |
| *D01G 11/00* | (2006.01) | |
| *F01D 5/28* | (2006.01) | |
| *F03D 1/06* | (2006.01) | |
| *B29K 105/12* | (2006.01) | |
| *B29K 307/04* | (2006.01) | |
| *B29L 31/08* | (2006.01) | |

(56) References Cited

U.S. PATENT DOCUMENTS

| | | | |
|---|---|---|---|
| 5,804,120 A | 9/1998 | Boerstoel et al. | |
| 5,817,801 A | 10/1998 | Boerstoel et al. | |
| 9,695,525 B1 | 7/2017 | Kaukler | |
| 2003/0034588 A1* | 2/2003 | Miura | B29C 70/46 |
| | | | 264/258 |
| 2016/0002829 A1* | 1/2016 | Lightman | D01G 11/00 |
| | | | 19/65 R |
| 2016/0237619 A1 | 8/2016 | Weilach et al. | |
| 2019/0010919 A1 | 1/2019 | Nielsen et al. | |

FOREIGN PATENT DOCUMENTS

| | | | | |
|---|---|---|---|---|
| CN | 106283273 | | 1/2017 | |
| CN | 106012107 | | 10/2019 | |
| FR | 2998572 | | 5/2014 | |
| GB | 1056321 A | * | 1/1967 | ............ B01D 37/00 |
| JP | 06010206 A | * | 1/1994 | ............ D01C 3/02 |
| WO | 8505115 | | 11/1985 | |
| WO | 2014081291 | | 5/2014 | |
| WO | 2014128128 | | 8/2014 | |
| WO | 2015077807 | | 6/2015 | |
| WO | 2017108692 | | 6/2017 | |

OTHER PUBLICATIONS

Translation of CN-1255585-C (published on May 10, 2006).*
International Search Report; International Application No. PCT/FR2018/053326 dated Mar. 8, 2019.
Boerstoel et al.: "Liquid Crystalline Solutions of Cellulose in Phosphoric Acid", Polymer 42 (2001), 7371-7379.
Jagdale et al: "Towards Green Carbon Fibre Manufacturing From Waste Cotton: A Microstructural and Physical Property Investigation", Manufacturing Review 4, 10 (2017).
Swatloski et al: "Dissolution of Cellose with Ionic Liquids", J. Am. Chem. Soc. 2002, 124, 4974-1975.
Yin et al: "Removal of Spandex From Nylon Spandex Blended Fabrics by Selective Polymer Degradation", Textile Research Journal, 2014, 84(1), 16-27.

* cited by examiner a/ b/ c/

METHOD FOR PRODUCING A CARBON FIBRE BY RECYCLING COTTON

CROSS REFERENCE TO RELATED APPLICATIONS

This application is a National Stage of International Application No. PCT/FR2018/053326, having an International Filing Date of 17 Dec. 2018, which designated the United States of America, and which International Application was published under PCT Article 21(2) as WO Publication No. 2019/122648 A1, which claims priority from and the benefit of French Patent Application No. 1762397, filed on 18 Dec. 2017, the disclosures of which are incorporated herein by reference in their entireties.

BACKGROUND

1. Field

The present disclosure lies in the general field of producing materials, particularly composite materials, based on carbon fibers, from biosourced materials.

More particularly, the present disclosure relates to a method for producing a carbon fiber, from a manufactured product made from cotton, as well as a continuous cellulose-based fiber obtained as an intermediate product when implementing such a method, and as well a carbon fiber and a web of carbon fibers obtained by such a method, and the use thereof for producing an article made from composite material. The disclosure also relates to a more general method for producing an article in composite material based on carbon fibers distributed in an organic polymer resin, comprising the implementation of a method for producing a carbon fiber according to the disclosure, as well as a material in composite material obtained with such a method.

2. Brief Description of Related Developments

Carbon fibers are used in numerous fields, making use of the particularly advantageous mechanical, electrical, and thermal properties thereof, and the light weight thereof.

Producing carbon fibers from renewable biosourced materials, with a view to resolving the problem of the unavoidable depletion of fossil resources, has been the subject of numerous research projects in recent decades. It has in particular been proposed by the prior art to produce such fibers from cellulose, a macromolecular carbohydrate which forms the wall of plant cells and represents the main constituent of wood. Cellulose is the most plentiful organic material on Earth. The carbon fibers obtained from cellulose have in particular the advantage of a very good structure.

Cotton in particular represents one of the most common types of natural cellulose fibers. Cotton fibers mostly consist of cellulose, for 92 to 95% by mass. As such, they represent the purest natural source of cellulose. Cellulose has a high molecular weight therein, with a degree of polymerization of between 2000 and 10,000.

For several decades, a very large quantity of cotton has been consumed worldwide, this quantity continuously growing, in particular for producing various textile products, such as clothing, household linen, furnishing textiles, etc., but also hygiene products or products for medical use. Recycling cotton, especially contained in manufactured textile products, in particular used products, is hence proving to be of major interest, in particular in environmental terms.

It has thus been proposed by the prior art to recycle the cotton making used textile products for various applications, and in particular for producing articles made from carbon fibers. Such an application of recycled cotton offers numerous advantages, from an environmental point of view, but also from an economic point of view. The cost price of used cotton is indeed substantially less than that of conventional precursor materials, such as purified cellulose, particularly obtained from the paper industry, or also polyacrylonitrile.

Such a prior art is in particular illustrated by the publication by Jagdale et al., 2017, in *Manufacturing Rev.* 4, 10: 1-9, which proposes subjecting a fabric made from cotton fibers to a pyrolysis treatment, to form a fabric made from carbon fibers.

SUMMARY

It has now been discovered by the present inventors that used cotton fibers derived from manufactured products, particularly textiles, can not only be used as is for producing articles made from carbon fibers, but that they can also, and very advantageously, be subjected to a conventional spinning method, to form continuous individual cellulose-based fibers which can be used for numerous applications, and which are particularly suitable for an application as precursors of carbon fibers, particularly for producing composite materials based on such fibers.

The aim of the present disclosure is thus that of proposing a method for recycling the cotton contained in manufactured products made from cotton to form, at a low cost, continuous carbon fibers, which are usable for numerous applications, and in particular for producing articles in composite materials.

DETAILED DESCRIPTION

For this purpose, the present invention proposes a method for producing a carbon fiber by recycling cotton, more specifically used cotton fibers, from a manufactured product made from cotton, such as a textile product, particularly a clothing, furnishing or household linen product, for example a sheet, an item of work clothing, a T-shirt, a polo shirt, trousers, etc., or a hygiene product or product for medical use, made from cotton.

The term cotton is used herein, in a conventional manner per se, to denote a natural cellulose fiber, obtained from seed hairs on the surface of cotton seeds.

The manufactured product made from cotton from which the method according to the disclosure is applied, and that the latter method is intended to recycle in order to form carbon fibers, may consist of any finished or even semi-finished manufactured product produced by human activity from raw materials. It particularly differs from cotton-based raw materials, such as pulp or powder derived from the cotton plant, which, even if they have been obtained by means of separation steps or other treatments from this plant, can in no case be considered as manufactured products. The manufactured product made from cotton according to the disclosure is formed from used cotton fibers, in the sense that these fibers have already been used, for the very production of this manufactured product. This manufactured product may itself be both new or used, in particular be at the end-of-life stage.

The method for producing a carbon fiber according to the disclosure comprises successive steps of:

a/ preparing a cellulose-based fiber, comprising:

a1/ collecting a manufactured product made from cotton, in particular, but not restrictively, excluding any other material;

a2/ mechanically treating this product in order to extract cotton therefrom in the form of short, discontinuous fibers, particularly less than or equal to 5 mm in length, referred to as recycled cotton fibers;

a3/ dissolving said recycled cotton fibers in a solvent solution, wherein cellulose is soluble, to form a so-called spinning solution;

a4/ producing a continuous cellulose-based fiber by means of a solvent spinning process, also commonly referred to as a wet-spinning process;

a5/ optionally, stretching the continuous cellulose-based fiber obtained, so as to form a longer fiber, the use of such a stretching step being particularly preferred within the scope of the disclosure;

b/ and carbonizing the continuous cellulose-based fiber obtained to form a carbon fiber.

The solvent spinning, or wet-spinning, process, used in step a4/ of the method according to the disclosure consists, in a conventional manner per se, of extruding the spinning solution through a spinning die, in a so-called coagulation bath containing a non-solvent of cellulose, which is miscible with the solvent solution used to prepare the spinning solution.

The solvent spinning process implemented according to the disclosure may be a so-called "wet" process, whereby the spinning die is submerged in the coagulation bath, or else a so-called "air-gap" process, whereby the spinning die is placed at a distance, generally between 1 mm and 20 cm, above the coagulation bath.

The method for producing a carbon fiber according to the disclosure is simple to implement, each of the steps thereof being suitable for being carried out using techniques known to those skilled in the art. It furthermore makes it possible to form carbon fibers having good qualities, particularly mechanical, at a particularly advantageous cost, substantially lower than that required to produce carbon fibers from conventional precursor materials, such as for example purified cellulose, obtained from the paper industry, or else polyacrylonitrile.

In particular, the method according to the disclosure, including a step of preparing a continuous cellulose-based fiber, which induces a rearrangement of the molecular structures within the fiber, makes it possible to obtain a final carbon fiber having substantially superior mechanical properties to the carbon fibers that would be obtained by direct carbonization of the recycled cotton fibers. The method according to the disclosure in particular advantageously makes it possible to obtain carbon fibers having a stress strength of greater than 1200 MPa, and even greater than or equal to 2500 MPa, and a Young's modulus of greater than 75 GPa, and even greater than or equal to 200 GPa, which is not permitted by the methods for producing carbon fibers from recycled cotton proposed by the prior art. These mechanical properties render them quite suitable for use in fields of application requiring a high strength of the materials used.

More generally, the carbon fibers obtained by means of the production method according to the disclosure find applications in numerous fields, particularly for making materials or parts intended to be used in fields as varied as the fields of construction and infrastructures, industrial equipment, automotive, rail or naval transport, electricity and electronics, sport and leisure, renewable and particularly wind energies, etc. For this purpose, they may be used as is, assembled in nonwoven form or else in woven or knit form, optionally mixed with other types of fibers.

The carbon fibers obtained by means of the production method according to the disclosure may advantageously be used, due to the low cost thereof, to replace glass fibers in applications requiring the use of reinforcement fibers of moderate stress strength and low cost price. For example, the carbon fibers obtained by means of the method according to the disclosure may be used for producing structures in the field of construction or renewable energy productions, such as wind or marine turbine blades, to replace all or some of the glass fibers hitherto used therein. The carbon fibers according to the invention may for example be used to replace 5 to 40%, in particular 10 to 30%, of these glass fibers.

The present disclosure thus relates particularly to a wind turbine blade, or a marine turbine blade, of large size, i.e. of at least 30 meters in length, and typically from 40 to 100 meters in length, formed from composite material based on reinforcement fibers dispersed in a polymer resin matrix, and comprising by way of reinforcement fibers of the blade, the latter being typically formed of two half-blades, between 5 and 40%, and preferably between 10 and 30%, of carbon fibers derived from cellulose obtained by means of a production method according to the disclosure, the remaining reinforcement fibers consisting of glass fibers. The density of these carbon fibers derived from cellulose is preferably advantageously between 1.3 and 1.8 $g/m^3$, whereas the density of glass fibers is approximately equal to 2.2 $g/m^3$. The above percentage of carbon fibers derived from cellulose obtained according to the disclosure, with respect to the total quantity of reinforcement fibers, is defined for the reinforcement fibers of the blade airfoil, and is understood in addition to the percentage of carbon fibers comprised in the resin-carbon composite spar (commonly referred to as "spar cap"), which is incorporated for large-sized blades inside the blade, in the volume defined by the half-blades.

The percentage and the distribution of the carbon fibers derived from cellulose in the blade is calculated in particular according to several criteria: dimensions and mechanical properties, weight, size, motor energy, target wind turbine power (advantageously 3 to 8 MW).

The wind turbine or similar (marine turbine, for example) blades thus obtained make it possible, for a target length and mechanical properties, to reduce the power required by the structure motors.

The method according to the disclsoure may furthermore fulfil one or more of the features described hereinafter, used alone or in each of the technically effective combinations thereof.

The mechanical treatment of the manufactured product made from cotton, intended to extract cotton therefrom in the form of short fibers, performed in step a2/ of the method according to the invention, may be carried out according to any method known to those skilled in the art.

This mechanical treatment may particularly comprise defibering the product, then unravelling same to extract the fibers therefrom.

This step may be preceded by various pre-treatment operations, such as cleaning and/or dusting, cutting, as well as removing the parts of the product not containing only cotton, such as buttons, seams, zippers, flocking elements, etc.

It may also be preceded, or followed, by various other mechanical or chemical treatment operations, of the manufactured product or of the recycled cotton fibers derived therefrom, for example deinking, so as to remove from the used cotton any traces of non-cellulosic mineral and organic elements having been used for the finishing thereof, such as dyes, finishes, etc.

In particular aspects of the disclosure, the fibers used in the composition of the manufactured product are exclusively cotton fibers, excluding any other material. Such a product is in particular denoted by the expression "100% cotton".

In such an aspect, preferentially, the method according to the disclosure does not include any advanced purification step of the recycled cotton fibers, such as those used by the prior art to prepare, from lignocellulosic biomass, the cellulose intended for producing carbon fibers. Thus, the time and the cost required for producing carbon fibers by means of the method according to the disclosure are substantially less than those of conventional methods for preparing carbon fibers from lignocellulosic biomass. The cost of the cellulosic raw material subjected to the spinning step is in particular substantially less than that of conventional methods for preparing carbon fibers.

In alternative embodiments of the disclosure, the manufactured product, from which the method for producing a carbon fiber according to the disclosure is implemented, contains fibers made from material(s) other than cotton, in particular non-cellulosic synthetic fibers. In this regard, mention may be made for example of synthetic polyethylene terephthalate (PET) filaments commonly referred to as polyester, acrylic fibers (for example, polyacrylonitrile PAN), fibers of elastane, a polyurethane and polyurea copolymer, or else polyamide fibers, commonly referred to as nylon.

The most common mixture used in the textile industry is the PET-cotton mixture, also known as polycotton.

The mass content of non-cellulosic synthetic fibers in a cotton fiber and synthetic fiber mixture in the composition of a manufactured textile product may vary from 0 to 50%.

When such synthetic fibers are contained in the manufactured product on which the method according to the disclosure is applied, after step a2/ of mechanically treating the product in order to extract recycled cotton fibers therefrom, these synthetic fibers are characterized by diameters generally between 10 and 20 µm and lengths dependent on the particular type of mechanical treatment that has been carried out.

In particular aspects of the disclosure, the method for producing a carbon fiber comprises a step of removing impurities with which the recycled cotton fibers obtained at the end the mechanical treatment step a2/ are potentially mixed at the end this step, in particular non-cellulosic synthetic fibers (as opposed to cotton fibers, which are natural fibers) potentially mixed with the recycled cotton fibers, for example polyester fibers, elastane fibers, and/or fibers of any other material which would be liable to reduce the yield of the solvent spinning process implemented according to the invention, particularly blocking the spinning die and/or impeding coagulation.

This step of removing impurities may be implemented before or after step a3/ of dissolving the recycled cotton fibers in the solvent solution, i.e. before or after preparing the spinning solution. It is always implemented before step a4/ of producing a continuous fiber by the solvent spinning process.

It may be carried out by mechanical, chemical, and/or enzymatic separation means, that are conventional per se.

Several such removal steps may be carried out successively, some optionally being implemented before, and others after, step a3/ of preparing the spinning solution.

Carrying out according to the disclsoure such a step of separating impurities, and more particularly synthetic fibers, which are mixed with the recycled cotton fibers according to the invention, advantageously facilitates the implementation of the solvent spinning process step and increases the yield of the method for producing a carbon fiber according to the invention.

In alternative aspects of the disclosure, the step of removing impurities, in particular non-cellulosic synthetic fibers, mixed with the recycled cotton fibers, is carried out after step a3/ of preparing the spinning solution, i.e. after the dissolution of the recycled cotton fibers in the solvent solution, for example a phosphoric acid solution. The solvent used in this step a3/ is preferably selected to dissolve the recycled cotton fibers, but not dissolve the non-cellulosic synthetic fibers. The step of removing impurities then comprises the separation of the undissolved fibers from the spinning solution.

This separation may advantageously be conducted by mechanical filtration. It may be performed in two steps. A first filtering step may consist of placing the spinning solution, containing the undissolved impurities, in a filter press type device equipped with filters of mesh size 350×350 µm. The solution is filtered under a pressure of 7 to 10 bar. This operation makes it possible to obtain an intermediate solution from which the longest synthetic fibers, i.e. the fibers over 1 mm in length, have been removed. A second filtering step may use a three-layer filter comprising screens of mesh size 60×60 µm, 80×80 µm, and 350×500 µm, respectively. The spinning solution may be filtered on these successive filters under a pressure of 10 to 50 bar, and retrieved. This second step makes it possible to remove all of the synthetic fibers non dissolved in the spinning solution.

Such a separation by mechanical filtration makes it possible advantageously to separate all of the undissolved synthetic fibers, regardless of the chemical nature thereof, non-selectively.

In further alternative aspects of the disclosure, the step of removing impurities, in particular non-cellulosic synthetic fibers, mixed with the recycled cotton fibers, is carried out before step a3/ of preparing the spinning solution, i.e. before the dissolution of the recycled cotton fibers in the solvent solution.

The step of removing impurities then comprises the separation of the non-cellulosic synthetic fibers and the recycled cotton fibers. This separation may be carried out using any conventional method known per se.

It may for example by carried out by selective dissolution of the non-cellulosic synthetic fibers, using a specific solvent for the type of synthetic fibers to be removed.

By way of example, when the synthetic fibers are polyester fibers, the latter may be dissolved in a mixture of dichloromethane and tetrahydrofuran, without degrading the recycled cotton fibers present in the mixture. Concentrated and hot caustic soda solutions may otherwise be used to dissolve the polyester fibers.

The polyester fibers may otherwise be removed by depolymerization, for example by glycolysis, as described particularly in the document FR 2 998 572. The glycolysis may for example be carried out by placing the mixture of polyester fibers and recycled cotton fibers in the presence of ethylene glycol and zinc acetate, and heating to 198° C.

under reflux. Bishydroxyethyl terephthalate crystals, one of the monomers of PET, are obtained by precipitation.

When the synthetic fibers are elastane fibers, the second most common compound after PET in cotton-based manufactured products, the mixture of elastane fibers and recycled cotton fibers may for example be placed in the presence of dimethylformamide or ethanol under hot conditions, particularly at about 220° C., then subjected to an ultrasonic mixing phase to induce the selective dissolution of the elastane fibers, as described in particular in the publication by Yin et al., 2014, in Text. Res. J. 84, 16-27.

The step of separating the non-cellulosic synthetic fibers and the recycled cotton fibers may otherwise be carried out by selective enzymatic degradation of the non-cellulosic synthetic fibers.

Step a3/ of dissolving the recycled cotton fibers in a solvent solution may use any conventional solvent solution of cellulose in the field of the solvent spinning process. The particular choice of solvent used is dependent on the exact spinning technique used.

By way of example, the solvent solution is selected from the solutions of zinc chloride, phosphoric acid, formic acid, dimethylol-ethyleneurea (DMEU), N-methylmorpholine-N-oxide (NMMO), ionic liquids, or any one of the technical possible mixtures thereof.

In particular aspects of the disclosure, the solvent solution is a phosphoric acid solution.

The dissolution of the recycled cotton fibers in the solvent solution may be assisted by a heat treatment, for example by heating under reduced pressure, then cooling to a very low temperature, in a conventional manner per se.

In preferred aspects of the disclosure, in step a3/ of dissolving the recycled cotton fibers in the solvent solution, the recycled cotton fibers are mixed with purified cellulose.

In the present description, purified cellulose denotes the cellulose obtained from lignocellulosic biomass, in particular so-called paper cellulose, i.e. derived from a paper manufacturing process and having a higher degree of purity than the cellulose contained in the recycled cotton fibers obtained according to the disclosure. Purified cellulose is routinely used, in the methods of the prior art, for producing carbon fibers.

The purified cellulose used in the context of the present invention may be derived from hardwood or resinous wood, from annual plants, such as straw or cotton, etc. It may have been obtained using any conventional method per se, for example using a Kraft cooking or soda process.

In the mixture of recycled cotton fibers and purified cellulose incorporated in the spinning solution, the purified cellulose is preferably present in a quantity by weight of between 20 and 90%, preferably between 40 and 60%, for example of about 50%, with respect to the total weight of the mixture of recycled cotton fibers and purified cellulose.

The total quantity of cellulose, derived from the recycled cotton fibers, and if applicable from the purified cellulose added thereto, dissolved in the solvent solution in step a3/, is between 1 and 50% by weight, preferably between 5 and 30% by weight, and for example between 10 and 20% by weight, with respect to the total weight of the spinning solution obtained.

Thus, in step a3/ of the method according to the invention, the concentration of recycled cotton fibers, if applicable of mixture of recycled cotton fibers and purified cellulose, dissolved in the solvent solution, is between 1 and 50% by weight, preferably between 5 and 30% by weight, and for example between 10 and 20% by weight, with respect to the total weight of the spinning solution obtained.

The recycled cotton fibers may also be mixed with substances other than purified cellulose, for example with lignin or polyacrylonitrile, making it advantageously possible to form carbon fibers with more enhanced mechanical properties, particularly having a stress strength greater than 4000 MPa. These mechanical properties render them particularly suitable for use in fields of application requiring a very high strength of the materials used, for example for producing hydrogen tanks.

The spinning solution may be filtered, in order to remove the solid particles therefrom, before carrying out the following step of the method according to the disclosure.

The method according to the disclosure may comprise adding to the spinning solution one or more additives, intended to better structure the material, to enhance the mechanical properties of the fibers formed, etc.

Each of these additives may particularly be present in the spinning solution at a content of between 1 ppm and 10% by weight, with respect to the total weight of the spinning solution, preferably between 1 ppm and 5% by weight, for example between 100 ppm and 1% by weight, with respect to the total weight of the spinning solution.

Examples of additives suitable for being added to the spinning solution according to the disclosure are compatibilizing agents, such as maleic anhydride-grafted polymers or copolymers. By way of example, mention may particularly be made of Lotader® 3300 marketed by the company Arkema, or indeed Beiwa® 901 from DzBh.

In particular aspects of the disclosure, a nanosized carbonaceous filler, or several nanosized carbonaceous fillers, is/are added to the spinning solution, during the implementation of step c/ of the method according to the disclosure, or immediately before or after. The nanosized carbonaceous fillers are preferably added to the spinning solution in a quantity of between 1 ppm and 30% by weight with respect to the weight of recycled cotton fibers, if applicable with respect to the weight of the mixture of recycled cotton fibers and purified cellulose, dissolved in the solvent solution during step c/. This concentration is preferentially between 0.001 and 5%, and particularly between 0.01 and 5%.

"Nanosized carbonaceous filler" denotes herein a filler comprising an element of the group formed of single- or multilayer carbon nanotubes, carbon nanofibers, graphene, graphene oxide, reduced graphene oxide, fullerenes, cellulose nanofibrils, nanocrystalline cellulose and carbon black, or any mixture of such elements. Preferably, the nanosized carbonaceous fillers integrated in the spinning solution according to the invention are carbon nanotubes, alone or in a mixture with graphene. Carbon nanotubes are for example marketed by the company Arkema under the name Graphistrength®.

The nanosized carbonaceous fillers according to the present disclosure may have a smaller dimension of between 0.1 and 200 nm, preferably between 0.1 and 160 nm, and preferentially between 0.1 and 50 nm. This dimension may for example by measured by light scattering.

"Graphene", according to the present disclsoure, denotes a planar, isolated, and individualized graphite layer, but also, by extension, an assembly comprising between one and some tens of layers and having a planar or more or less undulated structure. This definition thus includes FLGs (Few-Layer Graphene), NGPs (Nanosized Graphene Plates), CNSs (Carbon NanoSheets), GNRs (Graphene NanoRibbons). It excludes on the other hand carbon nanotubes and nanofibers, which respectively consist of winding one or more graphene layers coaxially and turbostratic stacking of these layers.

The nanosized carbonaceous fillers are preferably incorporated in the spinning solution according to the invention in the form of a liquid dispersion, that may be aqueous or solvent-based.

The dispersion of the nanosized carbonaceous fillers may be carried out by means of an ultrasound probe, a ball mill, a high-shear mixer, or any other device conventionally used, and if applicable in the presence of a surfactant.

The spinning process implemented in step a4/ of the method according to the disclosure, to form a continuous cellulose fiber, may be of any type known to those skilled in the art.

As described above, in this step, the spinning solution is injected via a spinning die consisting of one or more holes, into a coagulation bath, in static or in flow mode, directly into the bath (according to the so-called "wet-spinning" method) or via an air-gap (according to the so-called "dry-jet wet spinning" method). In contact with the coagulation bath, the fiber solidifies. A continuous cellulose-based fiber is then advantageously obtained.

The coagulation bath used may have any conventional composition per se, according to the solvent used in the composition of the spinning solution and the particular type of solvent spinning process used.

For example, the coagulation bath may be formed of isopropanol, water, acetone, or any other solvent enabling the coagulation of cellulose in contact therewith, or any one of the mixtures thereof.

The solvent spinning process used may be of any conventional type per se. It may for example consist of a process using phosphoric acid as a solvent for the spinning solution, the viscose process, the Lyocell process, or else a process using ionic liquids as a solvent for the spinning solution.

Particular examples of solvent spinning processes suitable for being used within the scope of the disclosure are particularly described in the documents WO 85/05115, U.S. Pat. Nos. 5,817,801, 5,804,120, or indeed the publications by Boerstel, 2001, in *Polymer*, 42: 7371-7379, or by Swatloski, 2002, in *JAGS*, 124: 4974-4975.

In a particular aspect of the disclosure, the spinning solution is formed based on phosphoric acid, optionally in the presence of a non-ionic emulsifier, and the coagulation bath is formed from isopropanol, alone or in a mixture with water.

The continuous cellulose-based fiber obtained by means of the spinning method according to the disclosure, that may have a monofilament or multifilament form, may then be washed and dried.

Optionally, it is subjected to a stretching step, to form a longer fiber.

The step of stretching fibers may be carried out according to any method and by means of any apparatus known to those skilled in the art for carrying out such an operation. It may particularly be carried out at a temperature inducing a softening of the material forming the fibers. For this purpose, the fibers pass successively over a bank of so-called feed rollers, through a furnace heated to said temperature, then over a bank of so-called stretching rollers. They are stretched between the two banks of rollers, according to the ratio of the rotational speeds of the feed rollers and the stretching rollers. They may otherwise be stretched over heating rollers rotating at different speeds.

Such stretching makes it advantageously possible to align the polymer chains along the fiber axis.

The fibers may optionally be treated at the spinning output, by treatments by radiation such as gamma rays, beta rays, electron beams, UV rays.

Then, the cellulose-based fiber obtained, which may have a substantial length, may be wound, for example on a cardboard tube.

The cellulose-based fiber obtained according to the present disclosure may then be sized, in a conventional manner per se, before undergoing the carbonizing step in order to obtain a continuous carbon fiber.

In an alternative aspect of the disclosure, the nanosized carbonaceous fillers are introduced into the sizing bath, and not into the spinning solution as described above.

Step b/ of carbonizing the continuous cellulose-based fiber of the method according to the disclosure is carried out in a conventional manner per se, using any combination of operating parameters described in the prior art for carbonizing cellulose fibers.

It is preferably carried out in an inert atmosphere.

The carbonization may be carried out continuously, the fiber passing through the carbonization furnace, or discontinuously, i.e. in static mode, the fiber being preferably kept under tension in the furnace.

Prior to the carbonization, the fiber may be impregnated with a carbonization-assisting agent, such as a siloxane.

The carbonization may be carried out at a temperature of between 1000 and 1500° C., and optionally preceded by a stabilization step in air at a temperature around 250° C.

Optionally, prior to the carbonizing step, the continuous cellulose-based fiber may be impregnated with so-called carbonization agents, promoting the increase of the mechanical properties of the carbon fiber finally obtained and the increase of the carbon yield of the carbonizing step. These carbonizing agents are conventional per se.

In particular aspects of the disclosure, the carbonization furnace is hermetically sealed and placed under vacuum at a value of less than $1.10^4$ Pa (0.1 bar). It is subsequently filled with an inert gas, such as nitrogen, argon, etc., and a gas leak is created such that the gas flow rate is between 50 and 500 volume renewals per hour. The pressure in the furnace is preferably between $1.10^3$ Pa and $5.10^4$ Pa above atmospheric pressure. The temperature applied in the carbonization furnace is preferably between 800° C. and 1500° C.

Following this carbonizing treatment, a carbon fiber is obtained.

This carbon fiber may then optionally be subjected to a graphitization treatment, so as to obtain a superior carbon structure, and hence more advantageous mechanical properties. This treatment may for example be carried out by heating the fiber to a temperature of between 2000 and 3000° C., in inert gas, for a duration of between 5 and 20 minutes.

The cellulose-based fiber according to the disclosure may otherwise be carbonized continuously, by passing it successively through different furnaces, of which a carbonization furnace containing an inert atmosphere at a temperature between 800° C. and 1500° C., followed by a graphitization furnace at a temperature of up to 2500° C. The movement speed of the fiber in these furnaces is then preferentially between 1 and 100 m/h.

The carbon fiber obtained at the end of the method according to the disclosure may have a diameter of between 5 and 30 micrometers, and a length of a few meters.

In particular aspects of the disclosure, the method comprises a step of forming a web of cellulose-based fibers from a plurality of continuous cellulose-based fibers obtained in step a4/ or a5/. Step b/ of carbonizing this continuous cellulose-based fiber is then carried out by carbonizing the web of continuous cellulose-based fibers, to form a web made of carbon fibers.

The web formed of cellulose-based fibers according to the disclosure may have any shape and any dimensions. The fibers may be arranged therein in woven fabrics of different weights and weaves, for example in taffetas, twill weave, satin, etc., used alone or in associations, or in nonwovens, for example wherein the fibers are all oriented in the same direction, or wherein the fibers are oriented at random, such as voile fabrics, felts, or nonwoven films. The term unidirectional webs is then used.

The continuous cellulose-based fibers according to the disclosure may be used, in the web, alone or in association with other types of fibers.

The carbonization of the web of continuous cellulose-based fibers may be carried out according to any carbonizing method known to those skilled in the art, in static mode or in continuous movement in a carbonization furnace. The features described above with reference to the treatment of the individual fibers apply similarly for carbonizing the web of continuous cellulose-based fibers according to the disclosure.

The webs of continuous cellulose-based fibers according to the disclosure may be subjected to carbonization individually, or in the form of a stack of webs, flat or after shaping in a desired shape.

A further aspect of the disclosure relates to a carbon fiber obtained by means of a method according to the disclosure, fulfilling one or more of the features above.

This carbon fiber is continuous, and it may have a diameter of between 1 and 1000 µm, preferably between 15 and 30 µm, and a length of a few meters.

It may advantageously have a stress strength of greater than 1200 MPa, preferably greater than or equal to 2000 MPa, and/or a Young's modulus of greater than 75 GPa, preferably greater than or equal to 200 GPa, these parameters being measured as per the ISO 11566 standard.

A further aspect of the disclosure relates to a continuous cellulose-based fiber obtained as an intermediate product during the implementation of a method for producing a carbon fiber according to the disclosure, at the end of step a/ of this method. This cellulose-based fiber is formed from recycled cotton, alone or in a mixture with other constituents, as listed above.

This continuous cellulose-based fiber may have a diameter of between 10 and 30 µm, and/or a strength of between 20 and 40 cN/tex, and/or a Young's modulus of between 15 and 30 GPa, these parameters being measured as per the ISO 2062 standard.

It is advantageously storable and transportable.

According to a further aspect, the present disclosure relates to a web of carbon fibers obtained from carbon fibers according to the disclosure, said carbon fibers being woven or knitted with one another or being juxtaposed therein in a nonwoven form.

A further aspect of the disclosure relates a web of carbon fibers obtained by means of a method for producing a carbon fiber according to the disclosure, this method including a step of forming a web of cellulose-based fibers from a plurality of continuous cellulose-based fibers obtained in step a4/ or a5/ of the method, and a step of carbonizing said continuous cellulose-based fibers, to form a web of carbon fibers.

The disclosure also relates to a fibrous three-dimensional structure obtained by stacking a plurality of webs of continuous cellulose-based fibers according to the disclosure, or by stacking a plurality of webs of carbon fibers according to the disclosure, optionally shaped in the desired shape, for example to form a preform for producing an article made from composite material based on reinforcement fibers distributed in a binder.

According to a further aspect, the present disclosure relates to the use of a carbon fiber or a web of carbon fibers according to the disclosure for producing an article in composite material made of carbon fibers distributed in an organic polymer resin matrix.

Another aspect of the disclosure further relates to a method for producing an article in composite material made of carbon fibers distributed in an organic polymer resin matrix, this method comprising:

implementing a method for producing a carbon fiber according to the disclosure, comprising the production of a carbon fiber by carbonizing an individual continuous cellulose-based fiber, and forming a web of carbon fibers from a plurality of carbon fibers thus obtained; or implementing a method for producing a carbon fiber according to the disclosure, comprising the formation of a web of continuous cellulose-based fibers and carbonizing this web of fibers to form a web of carbon fibers;

and producing an article in composite material from a plurality of webs of carbon fibers thus obtained.

The production of an article in composite material from a plurality of webs of carbon fibers obtained according to the present disclosure may be carried out according to any conventional method per se for those skilled in the art.

A composite material is defined in the present description conventionally, i.e. as consisting of the assembly of several different materials or elementary constituents bonded together, more particularly mechanically strong long fibers, in the present case carbon fibers, distributed in a matrix of organic polymer resin. The term resin defines herein a polymer compound, which may be of the thermoplastic or thermosetting type, which acts as a structural adhesive wherein the fibers are dispersed in a more or less organized manner. The composite material thus formed has mechanical properties which are inherent thereto, highly advantageous in terms of mechanical strength and light weight.

Schematically, producing such a composite material consists of molding according to the desired shape a stack of a plurality of carbon fiber webs impregnated with the non-polymerized organic resin, under conditions, particularly of temperature, inducing the polymerization of this resin.

The article in composite material according to the disclosure may for example be produced using the technique of draping plies pre-impregnated with resin, at least some of these plies consisting of webs of carbon fibers according to the disclosure, then polymerizing the whole in an autoclave so as to form, conventionally, the composite material; or else by resin injection or infusion techniques, in particular by the resin transfer molding technique, called RTM, on dry fiber plies, some of these plies consisting of webs of carbon fibers according to the invention.

The composite material produced according to the present disclosure may be of the monolithic type and/or sandwich type, for example having a honeycomb structure.

The fibers may be arranged therein in woven fabrics of different weights and weaves, for example in taffetas, twill weave, satin, etc., used alone or in associations, or in nonwovens, for example wherein the fibers are all oriented in the same direction.

The carbon fibers obtained according to the present disclosure may be used alone therein, or else in association with one or more other types of fibers, any configuration of such an association falling within the scope of the present disclosure.

Any conventional resin per se may be used in the context of the disclosure, particularly thermosetting type resins, for example epoxy resins, phenolic resins, or a mixture of the two, or else thermoplastic resins.

According to a further aspect, the present disclosure relates to an article in composite material made of carbon fibers distributed in an organic polymer resin matrix obtained by a production method according to the invention, fulfilling one or more of the above features.

Such an article in composite material advantageously finds an application in numerous fields.

Figure 1:
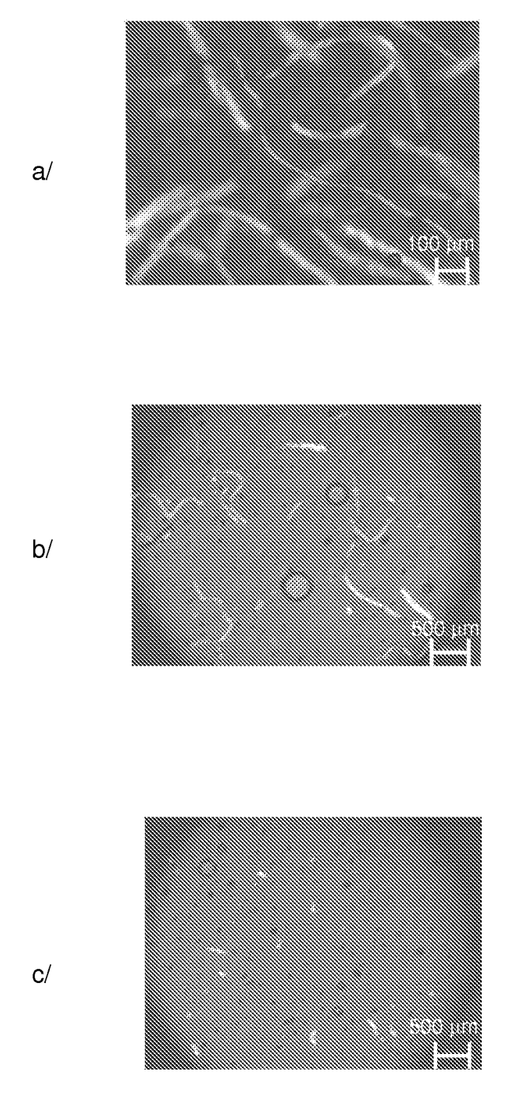
FIG. 1 shows microscopy images of a spinning solution formed during the implementation of a method for producing carbon fiber according to the present disclosure.

The features and advantages of the invention will emerge more clearly in the light of the examples hereinafter, provided merely by way of illustration and not restrictive of the disclosure, with reference to FIG. 1 which shows microscopy images of a spinning solution formed during the implementation of a method for producing carbon fiber according to the disclosure from a manufactured textile product based on cotton, polyester and elastane, respectively in a/ before separating the synthetic fibers, in b/ after a first step of separating by filtration, and in c/ after a second step by separating by filtration the synthetic fibers from the spinning solution.

EXAMPLE 1

Recycling of 100% Cotton Trousers

By way of example, a method for producing a carbon fiber according to the disclosure is implemented using a textile product made from cotton, such as 100% cotton trousers.

According to the disclosure, the buttons, zipper, and any other metallic elements are removed from these trousers.

The trousers are then cut, and undergo defibering then unravelling operations, in a conventional manner per se, to obtain small-sized cotton fibers, less than 5 mm in length.

These fibers are dissolved in phosphoric acid, in a quantity by weight of 10%, with respect to the total weight of the mixture.

An aqueous carbon nanotube dispersion, formed by means of a reactor connected to a ball mill and to an ultrasound probe, is added to this solution, by dispersing carbon nanotubes in a quantity of 0.9% by weight, in the presence of the surfactant marketed under the name Brij 520 at a concentration of 1.2% by weight, in water.

This aqueous dispersion is added to the spinning solution in a quantity of 0.1% by weight with respect to the weight of cellulose contained in the spinning solution. The dissolution quality is verified by optical microscopy and by means of viscosity measurements. This dispersion contains no aggregate greater than or equal to 1 µm in size.

A non-ionic emulsifier, such as the product marketed under the name Emulan®, is also added to this solution, in a quantity of 0.2% by weight with respect to the weight of cellulose contained in the spinning solution. Such a non-ionic emulsifier advantageously facilitates the impregnation of the cellulose of the recycled cotton fibers with phosphoric acid.

The mixture is heated to 45° C. for 15 min at a reduced pressure of 100 mbar and with stirring at 40 rpm, then cooled for 3 h at −10° C. with the same reduced pressure and the same stirring. It is then placed at 0° C. overnight, again under the same reduced pressure and stirring conditions, and finally cooled to −10° C.

In an alternative aspect of the method according to the disclosure, the recycled cotton fibers are mixed in the phosphoric acid solution with cellulose derived from wood obtained by a paper manufacturing process, of a higher degree of purity, for example in a ratio by weight of recycled cotton fibers/paper cellulose of 20/80 or 50/50.

The spinning solution obtained is extruded via a spinning die with 500 holes each of 80 µm in diameter, and injected directly into a coagulation bath composed of an isopropanol/water mixture (60/40 by volume).

The spinning parameters are for example as follows: spinning solution temperature 0° C., transfer pump speed 800 rpm, coagulation bath temperature 20° C.

Cellulose fibers, wherein the carbon nanotubes are trapped and well dispersed, are formed in the coagulation bath.

The fibers formed are driven into a neutralization bath, based on potassium hydroxide KOH, at 20° C., with a view to removing the phosphoric acid remaining on the fibers, then in a batch for washing with water at 15° C., before being dried with hot air in a furnace at 250° C.

They are then stretched on heating rollers at a temperature of 160° C., in a conventional manner per se.

The cellulose-based fibers are then wound at a winding rate of 12.1 m/min.

A cellulose-based multifilament fiber, about 25 µm in diameter, and several meters in length, is obtained.

This continuous cellulose-based fiber has a strength of between 20 and 40 cN/tex, and a Young's modulus of between 15 and 30 GPa (these parameters being measured as per the ISO 2062 standard).

This continuous cellulose-based fiber then undergoes a stabilization step in air at a temperature around 250° C., prior to a static carbonization step in nitrogen and under tension with a temperature gradient of 20 to 1200° C. at 3° C./min.

Prior to the carbonizing step, the continuous cellulose-based fiber may be impregnated with so-called carbonization agents, promoting the increase of the mechanical properties of the carbon fiber finally obtained, and of the carbon yield of the carbonizing step.

The carbonizing step may be followed by a graphitization step, by heating the fiber to a temperature of between 2000 and 3000° C., in inert gas, for a duration of between 5 and 20 minutes.

At the end of this method, a carbon fiber having particularly satisfactory mechanical properties, particularly a stress strength of greater than 1200 MPa and a Young's modulus of greater than 75 GPa (these parameters being measured as per the ISO 11566 standard) is obtained. This carbon fiber has been obtained at a very low cost, compared to carbon fibers formed by the conventional methods proposed by the prior art.

This carbon fiber may be used for numerous applications, for example for producing articles in composite material, wherein said fibers are dispersed in an organic polymer resin.

EXAMPLE 2

Recycling of Trousers Made From Cotton, Polyester, and Elastane

A method for producing a carbon fiber according to the disclosure is implemented using trousers made mostly from cotton, also based on elastane and polyester in lesser quantities.

According to the disclosure, the buttons, zipper, and any other metallic elements are removed from these trousers.

The trousers are then cut, and undergo defibering then unravelling operations, in a conventional manner per se, to obtain small-sized cotton fibers, less than 5 mm in length. These fibers comprise cotton fibers, synthetic elastane (co-polymer of polyurethane and polyurea) fibers, and synthetic polyester fibers.

According to a first alternative aspect, this mixture of fibers is mixed with a phosphoric acid solution, in a quantity by weight of 10%, with respect to the total weight of the mixture. A spinning solution is obtained, wherein the cotton fibers have been dissolved, but the polyester and elastane fibers have not. FIG. 1 shows in a/an image acquired by microscopy of this solution. The presence of numerous undissolved synthetic fibers is observed therein. The spinning solution is filtered in order to remove the solid impurities.

The filtration is carried out in two steps:
- a first filtering step in a filter press type device equipped with filters of mesh size 350×350 µm, under a pressure of 7-10 bar. At the end of this step, the longest synthetic fibers have been removed from the solution, wherein short synthetic fibers remain, as shown in b/ in FIG. 1;
- a second filtering step using a three-layer filter comprising screens of mesh size 60×60 µm, 80×80 µm, and 350×500 µm, at a pressure of 10 to 50 bar. At the end of this step, it is observed that all of the synthetic fibers have been removed from the solution, as shown in c/ in FIG. 1.

The solution retrieved, from which the solid impurities formed by the non-cellulosic synthetic fibers have been removed, forms the spinning solution used hereinafter in the method for producing a carbon fiber according to the disclosure.

According to a second alternative aspect, the fiber mixture is mixed with dimethylformamide at a temperature of 220° C. for 2 h, according to the protocol described in the publication by Yin et al., 2014, in Text. Res. J. 84, 16-27, in order to remove the elastane fibers therefrom. The mixture of cotton fibers and polyester fibers retrieved is then mixed with a dichloromethane and tetrahydrofuran solution, in order to remove the polyester fibers dissolved in this solution. The undissolved recycled cotton fibers, thus isolated, are mixed with a phosphoric acid solution, in a quantity by weight of 10%, with respect to the total weight of the mixture, in order to form a spinning solution.

Using the spinning solutions thus obtained, the method is then continued as described in example 1 above.

Schematically, the spinning solution to which an aqueous carbon nanotube dispersion, a non-ionic emulsifier and/or purified cellulose are optionally added, is extruded via a spinning die, and injected directly into a coagulation bath composed of a mixture of isopropanol/water (60/40 by volume).

Continuous cellulose fibers are formed in the coagulation bath, which are neutralized, then dried, and if applicable stretched.

These continuous cellulose-based fibers are subject to a stabilizing step in air followed by a carbonizing step.

This method makes it possible to form, with a good yield and at a low cost, carbon fibers having particularly satisfactory mechanical properties.

In particular, no blocking of the spinning die has been observed during the implementation of this method.

What is claimed is:

1. A method for producing a carbon fiber by recycling cotton, comprising steps of:
   a/ preparing a cellulose-based fiber, comprising:
      a1/ collecting a manufactured product made from cotton,
      a2/ mechanically treating said product in order to extract cotton therefrom in the form of short, discontinuous fibers, referred to as recycled cotton fibers,
      a3/ dissolving said recycled cotton fibers in a phosphoric acid solution as solvent solution, to form a so-called spinning solution,
      a4/ producing a continuous cellulose-based fiber by means of a solvent spinning process, and
      a5/ optionally, stretching the continuous cellulose-based fiber obtained; and
   b/ carbonizing said continuous cellulose-based fiber to form a carbon fiber.

2. The method for producing a carbon fiber according to claim 1, comprising a step of removing impurities with which the recycled cotton fibers obtained at the end of step a2/ are potentially mixed at the end of this step.

3. The method for producing a carbon fiber according to claim 1, wherein in step a3/ said recycled cotton fibers are mixed with purified cellulose.

4. The method for producing a carbon fiber according to claim 1, wherein in step a3/ the concentration of recycled cotton fibers, if applicable of mixture of recycled cotton fibers and purified cellulose, dissolved in the solvent solution, is between 5 and 30% by weight.

5. The method for producing a carbon fiber according to claim 1, wherein a nanosized carbonaceous filler, is added to the spinning solution.

6. The method for producing a carbon fiber according to claim 1, comprising a step of forming a web of cellulose-based fibers from a plurality of continuous cellulose-based fibers obtained in step a4/ or a5/, and wherein step b/ of carbonizing said continuous cellulose-based fiber is carried out by carbonizing said web of continuous cellulose-based fibers, to form a web of carbon fibers.

7. A method for producing an article in composite material made of carbon fibers distributed in an organic polymer resin matrix, comprising:
   implementing a method for producing a carbon fiber according to claim 1, and forming a web of carbon fibers from a plurality of carbon fibers obtained, or implementing a method for producing a carbon fiber according to claim 6 to form a web of carbon fibers, and producing said article in composite material from a plurality of webs of carbon fibers thus obtained.

8. The method for producing a carbon fiber according to claim 1, wherein the spinning solution contains a non-ionic emulsifier.

9. The method for producing a carbon fiber according to claim 2, comprising a step of removing non-cellulosic synthetic fibers from the spinning solution by mechanical filtration.

10. The method for producing a carbon fiber according to claim 5, wherein said nanosized carbonaceous filler is added to the spinning solution in a concentration of between 1 ppm and 5% by weight with respect to the weight of recycled cotton fibers, if applicable with respect to the weight of the mixture of recycled cotton fibers and purified cellulose, dissolved in said solvent solution during said step a3/.

* * * * *

UNITED STATES PATENT AND TRADEMARK OFFICE
CERTIFICATE OF CORRECTION

PATENT NO. : 11,578,433 B2
APPLICATION NO. : 16/954909
DATED : February 14, 2023
INVENTOR(S) : Mercader et al.

It is certified that error appears in the above-identified patent and that said Letters Patent is hereby corrected as shown below:

On the Title Page

Item (73) Assignees: "D'AQITAINE" should be "D'AQUITAINE"

Signed and Sealed this
Thirtieth Day of May, 2023

Katherine Kelly Vidal
*Director of the United States Patent and Trademark Office*